(12) United States Patent
Jones et al.

(10) Patent No.: US 9,791,152 B2
(45) Date of Patent: Oct. 17, 2017

(54) REGULATOR/MAGNETIC CONTROL VALVE COMBINATION

(71) Applicant: Lincoln Brass Works, Inc., Waynesboro, TN (US)

(72) Inventors: James Dean Jones, Waynesboro, TN (US); William J. Ferlin, Hartsville, TN (US)

(73) Assignee: Lincoln Brass Works, Inc., Waynesboro, TN (US)

( * ) Notice: Subject to any disclaimer, the term of this patent is extended or adjusted under 35 U.S.C. 154(b) by 0 days.

(21) Appl. No.: 14/808,052

(22) Filed: Jul. 24, 2015

(65) Prior Publication Data

US 2016/0025236 A1     Jan. 28, 2016

Related U.S. Application Data

(60) Provisional application No. 62/029,768, filed on Jul. 28, 2014.

(51) Int. Cl.
    *F23N 5/10*         (2006.01)
    *F24C 7/08*         (2006.01)
    (Continued)

(52) U.S. Cl.
CPC ............ *F23N 5/105* (2013.01); *A21B 1/28* (2013.01); *F16K 11/20* (2013.01); *F16K 31/06* (2013.01); *F16K 31/0624* (2013.01); *F23N 1/005* (2013.01); *F23N 5/203* (2013.01); *F23N 5/206* (2013.01); *F23N 5/245* (2013.01); *F24C 3/12* (2013.01); *F24C 7/085* (2013.01); *F23N 2023/08* (2013.01); *F23N 2035/04* (2013.01);
(Continued)

(58) Field of Classification Search
CPC .................... F23N 2035/24; Y10T 137/87877
See application file for complete search history.

(56) References Cited

U.S. PATENT DOCUMENTS 1,099,713   A   *   6/1914   Morris .................... F16K 11/22
                                                                        137/883
1,472,265   A   *   10/1923   Bell ........................ F01B 25/00
                                                                        105/37

(Continued)

OTHER PUBLICATIONS

White-Rodges. 25M01A-100 to 25M01A-199, HSI Single Stage Combination Gas Valve—Installation Instructions. Part No. 37-6643A. <http://www.emersonclimate.com/en-us/Products/Valves/Documents/0037-6643.pdf>. 6 pages.

(Continued)

*Primary Examiner* — Atif Chaudry
(74) *Attorney, Agent, or Firm* — Harness, Dickey & Pierce, P.L.C.

(57) ABSTRACT

A control valve may include a fluid inlet, a plurality of fluid outlets, and a plurality of magnets. One of the plurality of magnets controls fluid flow for each of one of the plurality of fluid outlets. One of the plurality of magnets controls fluid flow for the remaining of the plurality of magnets. When the magnet controlling fluid flow for the remaining of the plurality of magnets is energized, fluid flow is permitted to the remaining of the plurality of magnets. When the remaining of the plurality of magnets are energized, fluid flow is permitted to the respective plurality of fluid outlets.

17 Claims, 11 Drawing Sheets

(51) Int. Cl.
*F23N 5/20* (2006.01)
*F23N 5/24* (2006.01)
*F16K 31/06* (2006.01)
*F24C 3/12* (2006.01)
*F23N 1/00* (2006.01)
*A21B 1/28* (2006.01)
*F16K 11/20* (2006.01)

(52) U.S. Cl.
CPC ...... *F23N 2035/14* (2013.01); *F23N 2035/24* (2013.01); *Y10T 137/87877* (2015.04)

(56) References Cited

U.S. PATENT DOCUMENTS

| | | | | |
|---|---|---|---|---|
| 2,160,563 | A | * | 5/1939 | Roesch .................. F16K 11/22 110/105.5 |
| 3,476,315 | A | | 11/1969 | Biggle |
| 3,692,239 | A | | 9/1972 | Genbauffe |
| 3,954,384 | A | * | 5/1976 | Tyler ........................ F23Q 9/12 236/99 R |
| 4,354,633 | A | | 10/1982 | Turner et al. |
| 4,424,830 | A | | 1/1984 | Arnsperger et al. |
| 4,501,290 | A | | 2/1985 | Sturman et al. |
| 4,632,303 | A | * | 12/1986 | Rodittis ................. G05D 23/24 236/10 |
| 4,718,448 | A | | 1/1988 | Love et al. |
| 4,749,005 | A | | 6/1988 | Bergquist |
| 4,870,993 | A | | 10/1989 | Casuso |
| 5,199,456 | A | | 4/1993 | Love et al. |
| 5,435,343 | A | | 7/1995 | Buezis |
| 5,605,173 | A | | 2/1997 | Arnaud |
| 5,937,846 | A | | 8/1999 | Martin et al. |
| 5,988,204 | A | * | 11/1999 | Reinhardt .......... G05D 16/0661 137/271 |
| 5,988,215 | A | | 11/1999 | Martin et al. |
| 6,073,649 | A | | 6/2000 | Somorov |
| 6,322,352 | B1 | | 11/2001 | Zink |
| 6,363,971 | B1 | | 4/2002 | Kaylan et al. |
| 6,789,572 | B2 | | 9/2004 | Pierog et al. |
| 6,886,581 | B2 | | 5/2005 | Harniet |
| 6,938,634 | B2 | | 9/2005 | Dewey, Jr. |
| 7,156,370 | B2 | | 1/2007 | Albizuri |
| 7,651,330 | B2 | | 1/2010 | Albizuri |
| 7,950,384 | B2 | | 5/2011 | Albizuri |
| 7,963,763 | B2 | | 6/2011 | Albizuri |
| 8,092,212 | B2 | | 1/2012 | Albizuri |
| 8,281,780 | B2 | | 10/2012 | Carvalho et al. |
| 8,282,390 | B2 | | 10/2012 | Albizuri |
| D677,754 | S | | 3/2013 | Pierog et al. |
| 8,449,289 | B2 | | 5/2013 | Albizuri |
| 8,613,276 | B2 | | 12/2013 | Parrish |
| 2002/0073985 | A1 | * | 6/2002 | Leukhardt, III ........ F23N 5/102 126/39 E |
| 2006/0213496 | A1 | * | 9/2006 | Kimble ..................... F24C 3/12 126/39 N |
| 2010/0236538 | A1 | * | 9/2010 | Wah ........................ F23N 5/105 126/39 BA |
| 2010/0276925 | A1 | * | 11/2010 | Bareiss ................... B60T 8/368 285/125.1 |
| 2011/0232627 | A1 | | 9/2011 | Arizmendi Zurutuza et al. |
| 2012/0115096 | A1 | | 5/2012 | Gadini et al. |
| 2013/0213384 | A1 | | 8/2013 | Albizuri |
| 2014/0080078 | A1 | | 3/2014 | Albizuri |

OTHER PUBLICATIONS

White-Rodges. 25M Series Gas Controls Product Information R-4080. <http:// http://www.emersonclimate.com/Documents/White-Rodgers/sell_sheets/r_4080.pdf>. 8 pages.

European Search Report and Written Opinion for Application No. 16178818.7, dated Dec. 23, 2016.

* cited by examiner

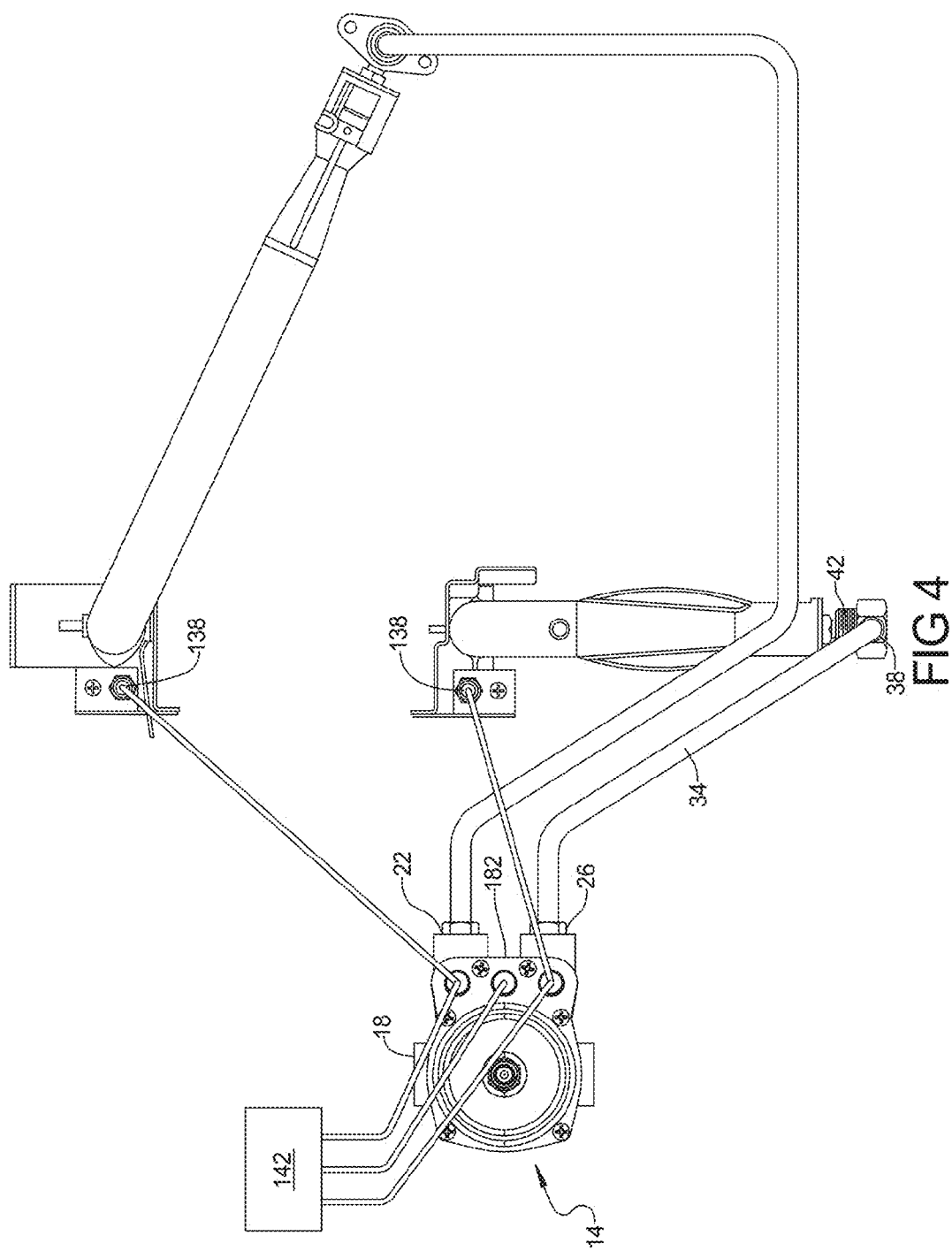

though these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

REGULATOR/MAGNETIC CONTROL VALVE COMBINATION

CROSS-REFERENCE TO RELATED APPLICATIONS

This application claims the benefit of U.S. Provisional Application No. 62/029,768, filed on Jul. 28, 2014. The entire disclosure of the above application is incorporated herein by reference.

FIELD

The present disclosure relates to a control valve, and specifically a regulator and magnetic control valve combination for a gas range.

BACKGROUND

This section provides background information related to the present disclosure and is not necessarily prior art.

Conventional controls for gas applications, such as ranges, provide a regulated control of an unregulated gas supply. For example, as illustrated in FIG. 1, an arrangement may have a single gas inlet from which an unregulated gas supply is connected and one outlet connected to both a broil burner bimetal strip valve and a bake burner bimetal strip valve. The broil burner bimetal strip may have an electrical connection and a tubing connection to the broil burner, and the bake burner bimetal strip may have an electrical connection and an orifice connection to the bake burner.

SUMMARY

This section provides a general summary of the disclosure, and is not a comprehensive disclosure of its full scope or all of its features.

A control valve may include a fluid inlet, a plurality of fluid outlets, and a plurality of magnets. One of the plurality of magnets controls fluid flow for each of the plurality of fluid outlets. One of the plurality of magnets controls fluid flow for the remainder of the plurality of magnets. When the magnet controlling fluid flow for the remainder of the plurality of magnets is energized, fluid flow is permitted to the remainder of the plurality of magnets. When the remainder of the plurality of magnets are energized, fluid flow is permitted to the respective plurality of fluid outlets.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is an assembly view of a control system incorporating the control valve of FIG. 2;

Corresponding reference numerals indicate corresponding parts throughout the several views of the drawings.

DETAILED DESCRIPTION

Figure 1:
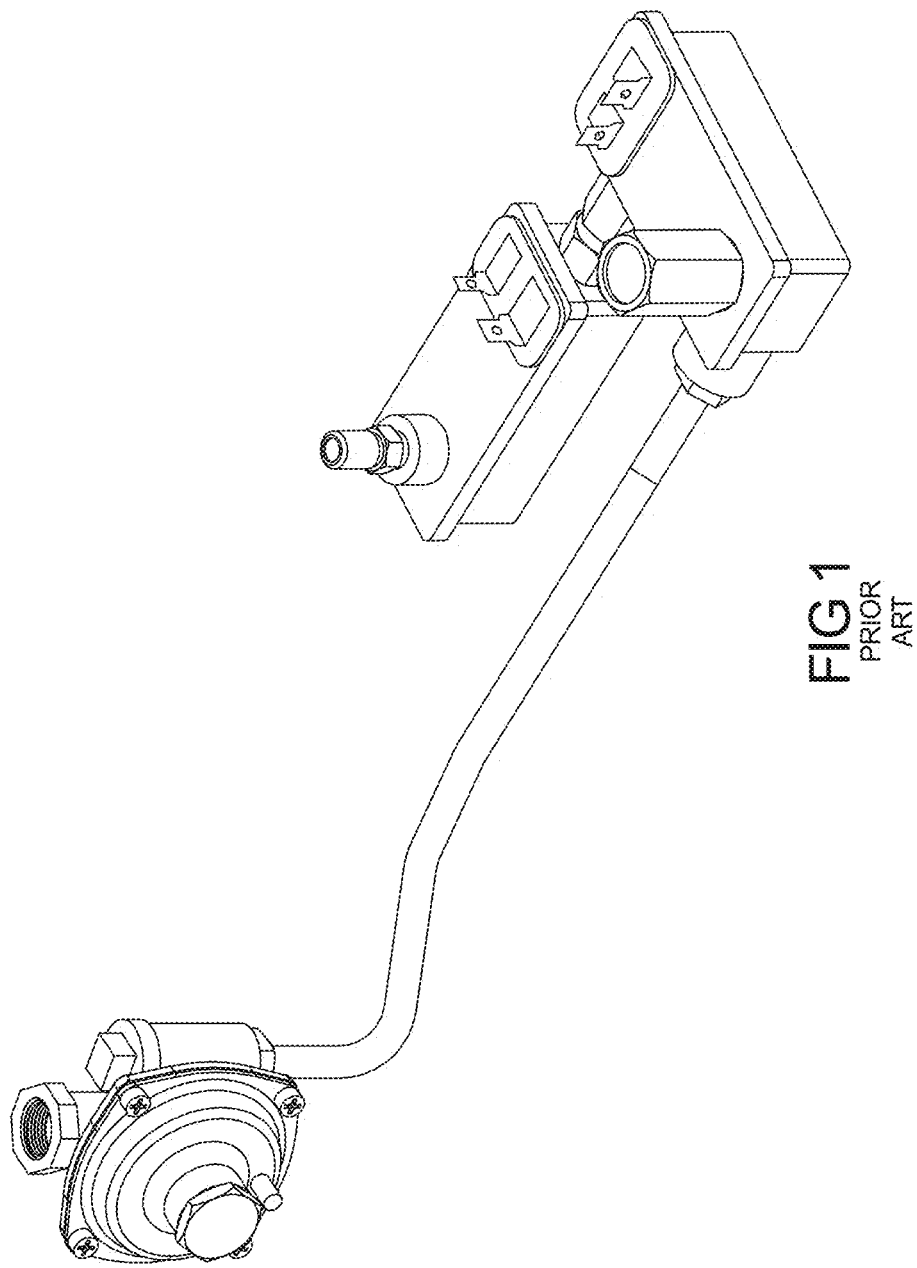
FIG. 1 is a perspective view of a prior art control valve with bimetal strip valves and a regulator.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
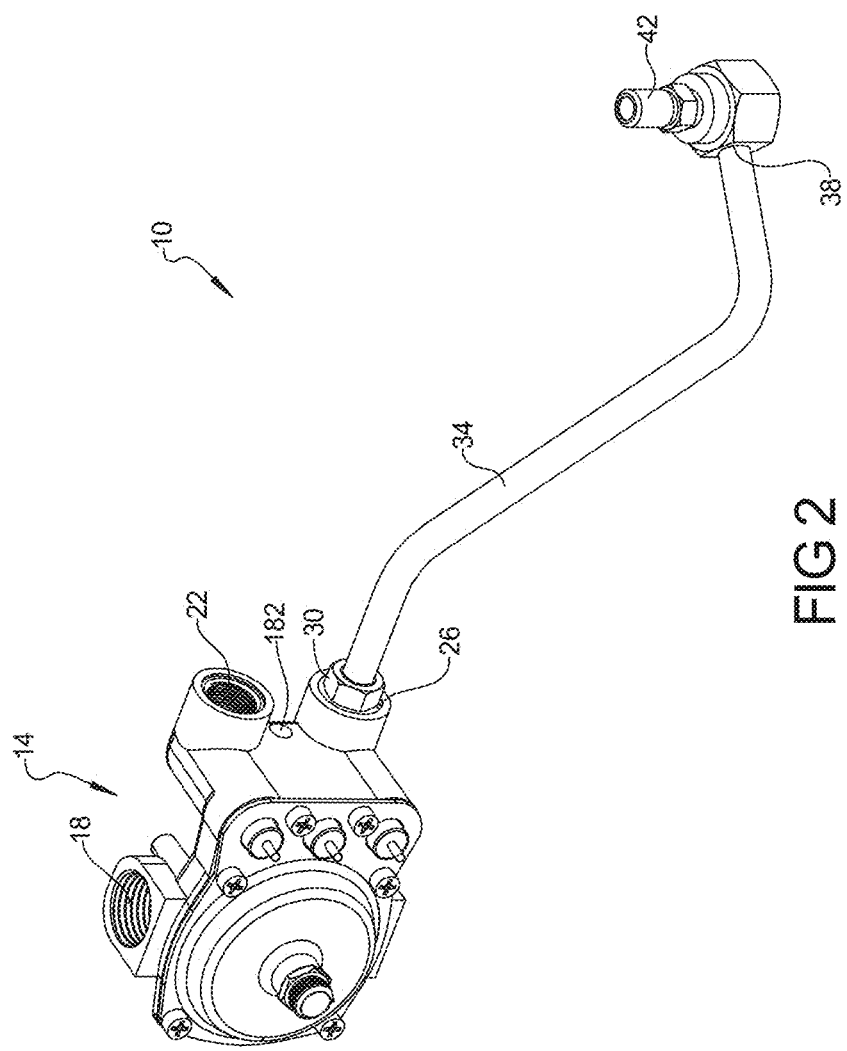
FIG. 2 is a perspective view of a control valve according to the present disclosure.

Now referring to FIG. 2, a control valve 10 for regulating gas to a gas range oven is illustrated. The control valve 10 includes a regulator magnet valve 14, a gas inlet 18, and a plurality of outlets 22, 26. A first outlet 22 is a connection to a broil burner. A second outlet 26 is a connection to a bake burner. The second outlet receives a first end 30 of a tubular connector 34. A second end 38 of the tubular connector 34 is fixed to an orifice holder 42 to the bake burner.

Figure 3:
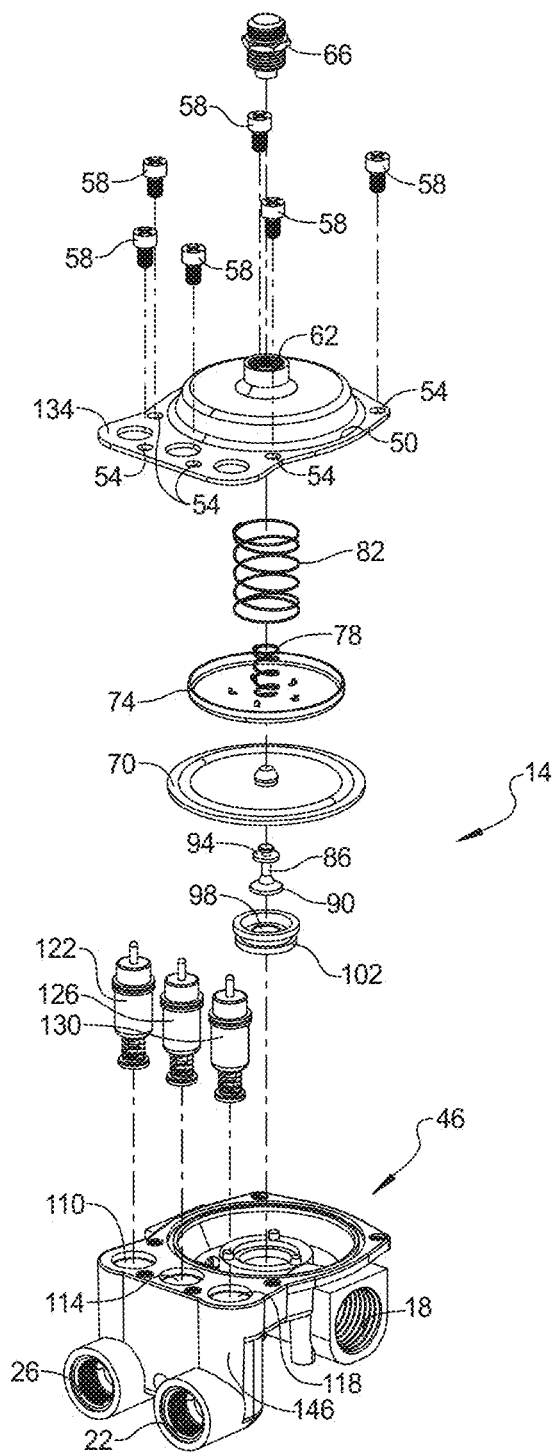
FIG. 3 is an exploded view of the control valve of FIG. 2.

As illustrated in FIGS. 3 and 4, the regulator magnet valve 14 further includes a body 46 and a regulator cap 50 having a plurality of apertures 54 for receiving a plurality of fasteners 58 fixing the regulator cap 50 to the body 46. The regulator cap 50 also has a threaded aperture 62 in its center for receiving a threaded converter cap cover 66. A diaphragm 70 and diaphragm plate 74 are positioned within the regulator cap 50 and body 46. A liquefied petroleum gas (LP) spring 78 and a natural gas (NAT) spring 82 extend between the diaphragm plate 74 and the regulator cap 50.

A plunger 86 having a head 90 and a tail 94 is positioned within the inlet 18. The tail 94 extends through an aperture 98 in a plunger gasket 102 and contacts the diaphragm 70. The plunger gasket 102 contacts the head 90 of the plunger 86 when the plunger 86 is in a first position, preventing gas flow through the aperture 98 in the plunger gasket 102. The aperture 98 extends through the plunger gasket 102 and into the inlet 18, providing access for the flow of pressurized gas traveling from the inlet 18 to a gas chamber 106 (see FIG. 6) within the body 46.

The body 46 further includes three cylindrical apertures 110, 114, 118 for receiving a bake burner magnet 122, a middle magnet 126, and a broil burner magnet 130. The bake burner magnet 122, middle magnet 126, and broil burner magnet 130 are secured within the body 46 by a magnet plate portion 134 of the regulator cap 50. The magnets 122, 126, 130 are controlled, or energized, by one or more thermocouples 138 and a control panel 142 (FIG. 4).

Figure 6:
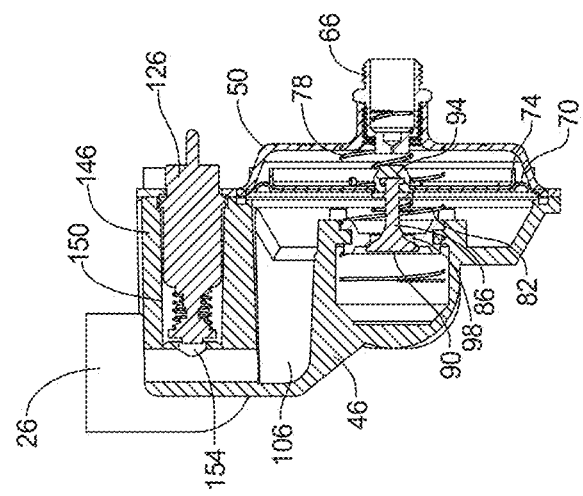
FIG. 6 is a section view cut at 5-5 of FIG. 5.
Figure 5:
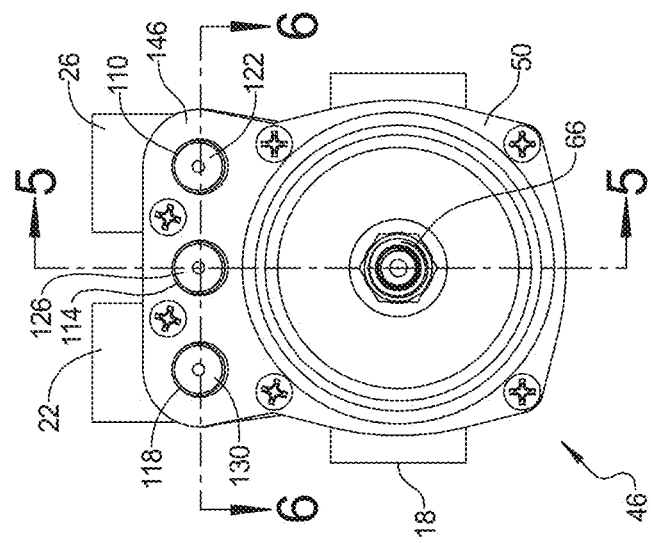
FIG. 5 is a front view of the control valve of FIG. 2.

As further illustrated in FIGS. 5 and 6, the plunger 86 is biased in the first position by pressure from the pressurized gas entering the inlet 18. When in the first position, the plunger 86 blocks the flow of pressurized gas into the gas chamber 106. Further, the plunger 86 contacts the diaphragm 70, maintaining the diaphragm 70 in a first position. The force exerted on the diaphragm 70 from the plunger 86 is also exerted on the diaphragm plate 74. The NAT spring 82 and LP spring 78 are compressed from the pressure of the pressurized gas on the head 90 of the plunger 86.

When the plunger 86 is engaged by turning the converter cap cover 66, the plunger 86 moves from the first position to a second position, releasing contact with the diaphragm 70 and plunger gasket 102. The LP spring 78 and NAT spring 82 decompress, biasing the diaphragm 70 and diaphragm plate 74 in a second position towards the aperture 98. Since the plunger 86 no longer contacts the plunger gasket 102, pressurized gas flows through the aperture 98 and into the gas chamber 106 in the body 46. The gas chamber 106 routes the pressurized gas through the body 46 to a magnet regulator portion 146 of the control valve 10.

Figures 7A, 7B:
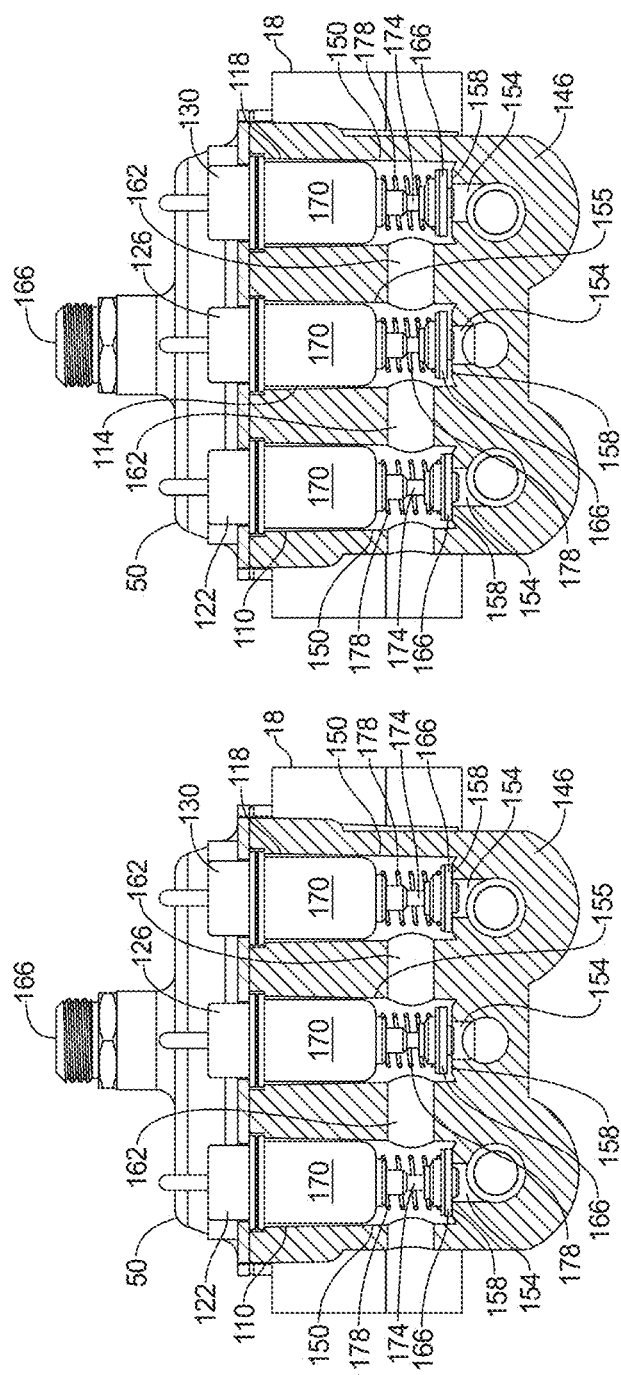
FIG. 7a is a section view cut at 6-6 of FIG. 5 with a middle magnet in an energized state.
FIG. 7b is a section view cut at 6-6 of FIG. 5 with a bake burner magnet in an energized state.
Figure 7C:
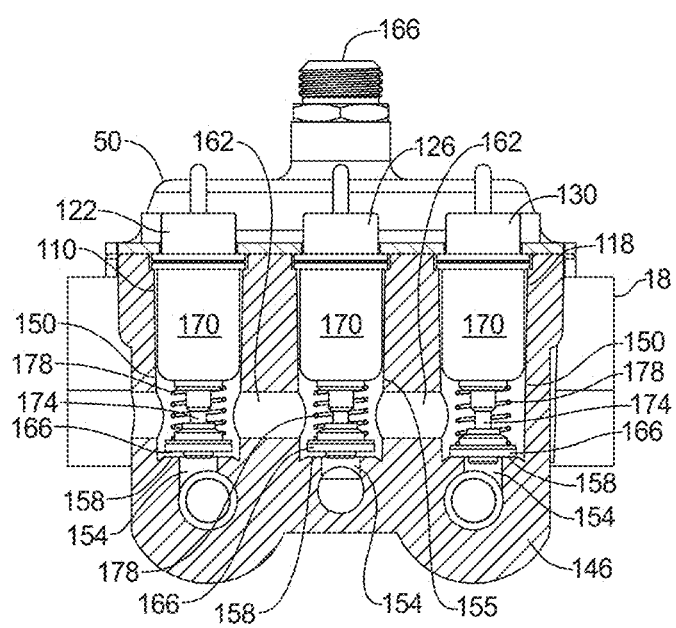
FIG. 7c is a section view cut at 6-6 of FIG. 5 with a broil burner magnet in an energized state.

Now referring to FIGS. 7a-7c, the magnet regulator portion 146 of the control valve 10 is illustrated. The magnet regulator portion 146 includes the cylindrical apertures 110, 114, 118 housing the bake burner magnet 122, the middle magnet 126, and the broil burner magnet 130, respectively. The cylindrical apertures 110, 114, 118 include a larger diameter portion 150 and a smaller diameter portion 154. The larger diameter portion 150 is sized slightly larger than the diameter of the magnets 122, 126, 130, so as to accept each of the magnets 122, 126, 130 in the aperture 110, 114, 118. The smaller diameter portion 154 is sized to mate with the respective outlet 22, 26. A ledge 158 separates the larger diameter portion 150 from the smaller diameter portion 154.

A passage, or tube, 162 connects the cylindrical aperture 110 housing the bake burner magnet 122 to the cylindrical aperture 114 housing the middle magnet 126 and the cylindrical aperture 114 housing the middle magnet 126 to the cylindrical aperture 118 housing the broil burner magnet 130. The magnets 122, 126, 130 act as valve actuators, either permitting or preventing the flow of the pressurized gas. Each magnet assembly 122, 126, 130 includes a head 166 connected to a body 170 with a rod 174. The rod 174 is slideably attached to the body 170 such that the head 166 and rod 174 may move along a longitudinal axis relative to the body 170. A spring 178 is located between the head 166 and the body 170 along the rod 174. The spring 178 biases the head in a first position.

When in the first position, the head 166 of the magnet 122, 126, 130 contacts the ledge 158 preventing flow of the pressurized gas from the larger diameter portion 150 into the smaller diameter portion 154. When the magnet 122, 126, 130 is energized, the magnet head 166 is drawn toward the body 170, overcoming the force of the spring 178 and compressing the spring 178 to move the head 166 away from the ledge 158. When the magnet 122, 126, 130 is energized, the head 166 moves from the first position to a second position or open or latched position.

The magnet 122, 126, 130 is an electromechanical valve where the head 166 and rod 174 form a plunger that moves up and down to regulate the flow of fluid in the magnet regulator portion 146 of the control valve 10. Current is supplied to the magnet body 170 from one of the control panel 142 and the thermocouple 138 (FIG. 4) to energize the magnet 122, 126, 130 and draw the head 166 toward the body 170. Current may also be cut off from the magnet 122, 126, 130 by one of the control panel 142 and the thermocouple 138 to allow the head 166 to move away from the body 170.

Referring specifically to FIGS. 6 and 7a, the pressurized gas enters the magnet regulator portion 146 from the gas chamber 106 in the body 46. The gas chamber 106 delivers the pressurized gas to the cylindrical aperture 114 in the body 46 containing the middle magnet 126. As shown best in FIG. 6, the middle magnet 126 either prevents or permits the flow of gas from the gas chamber 106 and smaller diameter portion 154 to the larger diameter portion 150. If the middle magnet 126 prevents the flow of gas, gas is maintained in the gas chamber 106 in the body 46 of the control valve 10. A ball 182 (see FIG. 2) is located at the end of the gas chamber 106 and prevents the gas from escaping into the environment.

For gas to be permitted to flow to the bake burner outlet 26 or the broil burner outlet 22, the middle magnet 126 must "latch in" (i.e., permit the flow of gas) followed by the bake burner magnet 122 or broil burner magnet 130 latching. The middle magnet 126 latches when the magnet 126 becomes energized, moving the head 166 of the middle magnet 126 from the first position to the second, or latched or open, position. Once the middle magnet 126 has latched in, gas flows from the gas chamber 106 into the larger diameter portion 150 of the middle magnet 126 and into the passage 162 connecting the cylindrical aperture 110 housing the bake burner magnet 122 to the cylindrical aperture 114 housing the middle magnet 126 and the cylindrical aperture 114 housing the middle magnet 126 to the cylindrical aperture 118 housing the broil burner magnet 130. The gas is maintained in the passage 162 until at least one of the bake burner magnet 122 and the broil burner magnet 130 is energized and latches in the open position.

Now referring to FIGS. 6 and 7b, when the broil burner is turned on, the broil burner magnet 130 is energized and the head 166 of the broil burner magnet 130 moves from the first position to the second, or open, position. When the head 166 of the broil burner magnet 130 is in the second position, gas flows from the smaller diameter portion 154 of the aperture 118 to the larger diameter portion 150 of the aperture 118. The larger diameter portion 150 is connected to the first outlet 22 to the broil burner. Gas will continue to flow from the gas chamber 106, through the cylindrical aperture 114 housing the middle magnet 126, through the passage 162, and through the cylindrical aperture 118 housing the head 166 of the broil burner magnet 130 to the first outlet 22 as long as both the middle magnet 126 and the broil burner magnet 130 remain latched in the open position.

Now referring to FIGS. 6 and 7c, when the bake burner is turned on, the bake burner magnet 122 is energized and moves the head 166 of the bake burner magnet 133 from the first position to the second, or open, position. When the head 166 of the bake burner magnet 122 is in the second position, gas flows from the smaller diameter portion 154 of the aperture 110 to the larger diameter portion 150 of the aperture 110. The larger diameter portion 150 is connected to the second outlet 26 to the bake burner. The tubular connector 34 transports the gas from the second outlet 26 to the orifice holder 42 to the bake burner. Gas will continue to flow from the gas chamber 106, through the cylindrical aperture 114 housing the middle magnet 126, through the passage 162, and through the cylindrical aperture 110 housing the head 166 of the bake burner magnet 122 to the second outlet 26 as long as both the middle magnet 126 and the bake burner magnet 122 remain latched in the open position.

Figure 8:
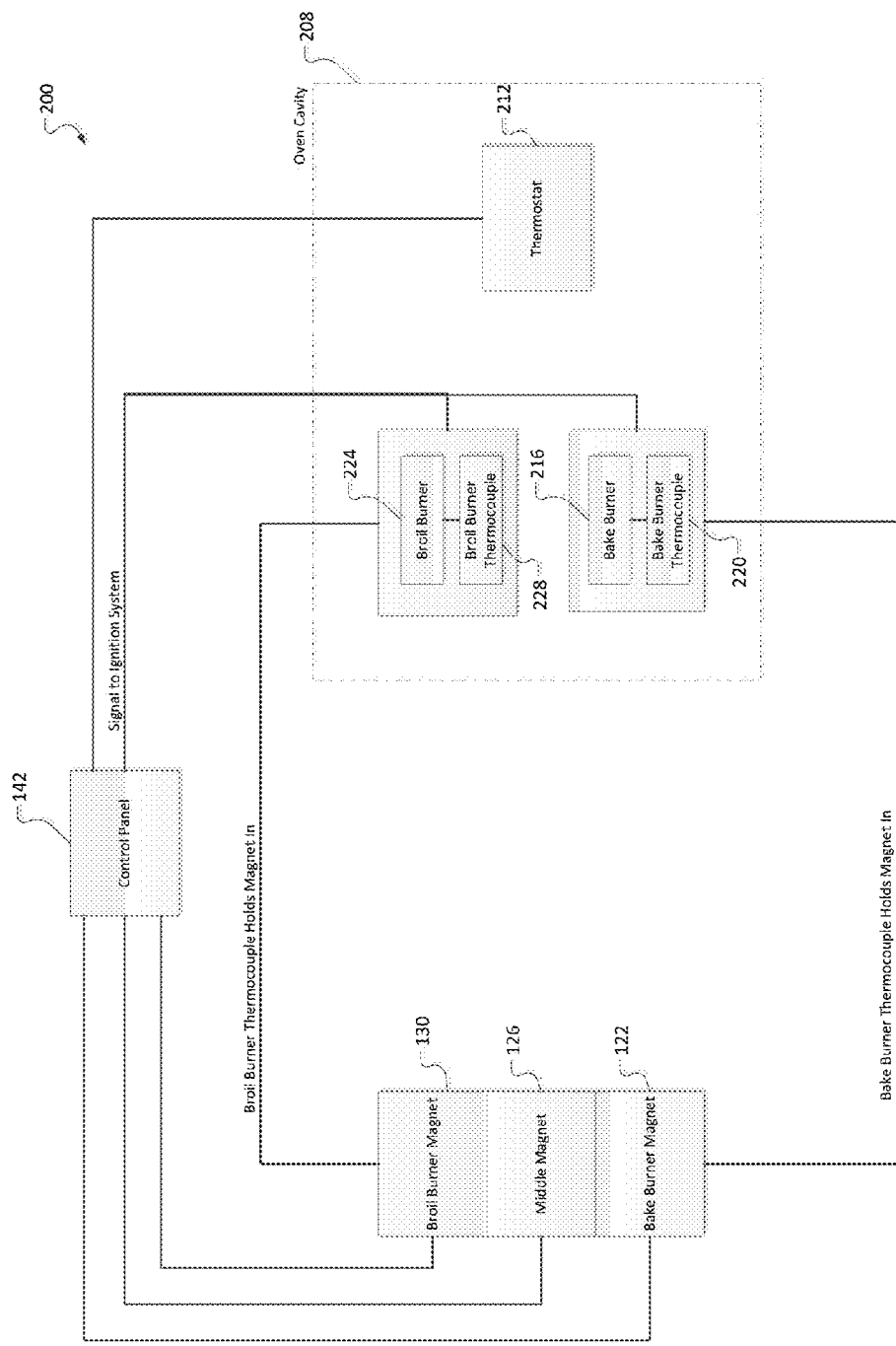
FIG. 8 is a block diagram of a control system for an oven.

Now referring to FIG. 8, a control system 200 for the oven is illustrated. The control system 200 includes the control panel 142 (also see FIG. 4) that communicates with an oven cavity 208 having a thermostat 212, a bake burner 216, a bake burner thermocouple 220, a broil burner 224, and a broil burner thermocouple 228. The control panel 204 also communicates with the bake burner magnet 122, the middle magnet 126, and the broil burner magnet 130. Further, the bake burner magnet 122 and the broil burner magnet 130 communicate with the bake burner thermocouple 220 and broil burner thermocouple 228, respectively. The timing and content of the communications are discussed in further detail below in relation to FIGS. 10-11.

Figure 9:
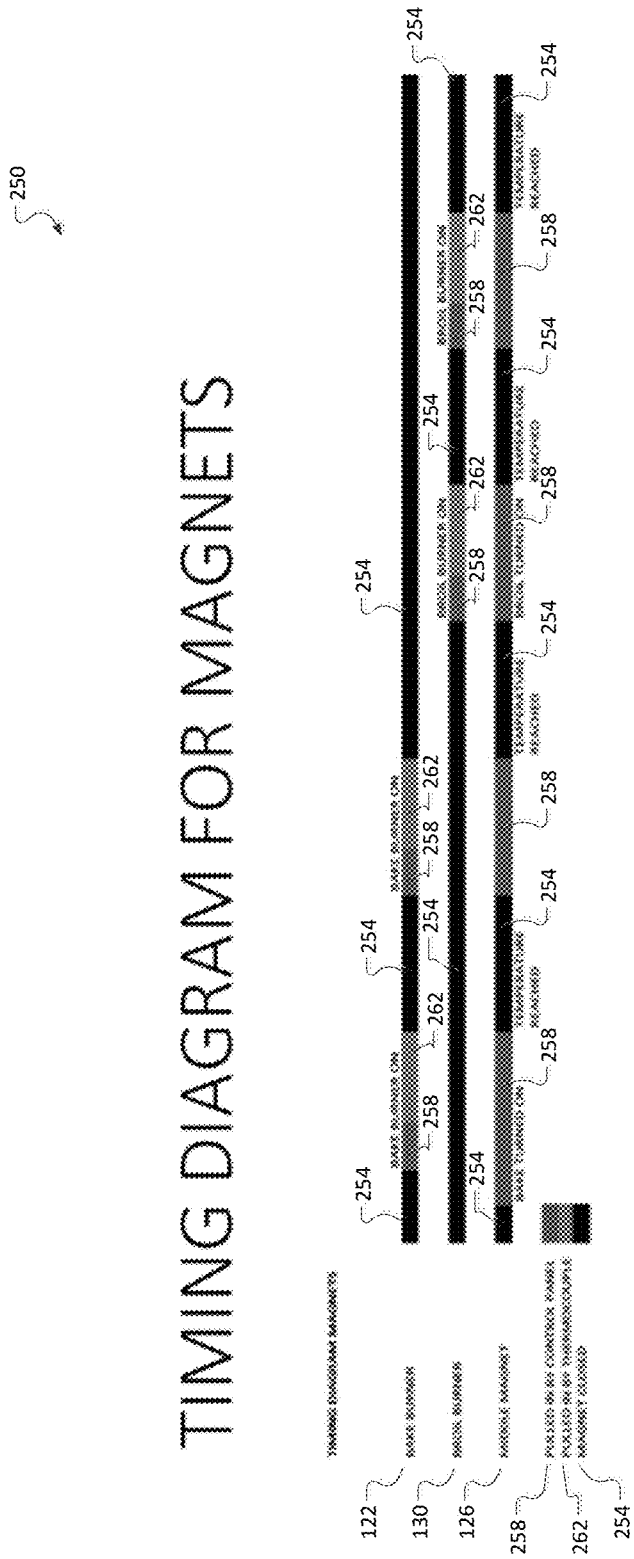
FIG. 9 is an example timing diagram for the control valve of FIG. 2.

Referring to FIG. 9, an example timing diagram 250 for the magnets 122, 126, 130 is illustrated. The darkest timeline portions 254 indicate that the magnet (i.e. the middle magnet 126, the bake burner magnet 122, and the broil burner magnet 130) is in the first, or closed, position. When the magnet 122, 126, 130 is in the first position, the magnet head 166 prevents the flow of gas between the smaller diameter portion 154 and the larger diameter portion 150 and thus from the gas chamber 106 to the first outlet 22 or second outlet 26.

The medium shaded timeline portions 258 indicate that the magnet 122, 126, and/or 130 is energized by the control panel 142 (FIG. 4). The control panel 142 is activated by a user turning on the bake or broil function of the oven. The control panel 142 emits an electric signal that creates a field to energize the magnets 122, 126, 130. When the magnet 122, 126, and/or 130 is energized by the control panel 142, the magnet 122, 126, 130 moves the magnet head 166 from the first position to the second position. When in the second position, the head 166 is latched in, permitting the flow of gas between the smaller diameter portion 154 and the larger diameter portion 150 and thus from the gas chamber 106 to at least one of the first outlet 22 or second outlet 26. Gas will continue to flow from the gas chamber 106, to the first outlet 22 and/or the second outlet 26 as long as both the middle magnet 126 and at least one of the broil burner magnet 130 and the bake burner magnet 122 remain energized by one of the control panel 142 and the thermocouples 220, 228.

The lightest shaded timeline portions 262 indicate that the magnet 122, 130 is energized by the thermocouple 220, 228 (FIG. 8). The thermocouples 220 and 228 only control the bake burner magnet 122 and the broil burner magnet 130, respectively. The middle magnet 126 is only controlled by the control panel 142 The thermocouple 220, 228 provides a voltage to the magnet 122, 130 to energize the magnet 122, 130 and attract the respective magnet heads 166 to the bodies 170. When the magnet 122, 130 is energized by the thermocouple 220, 228, the magnet heads 166 are in the second, or open, position. When the head 166 is in the second position, the magnet head 166 is latched in, permitting the flow of gas from the smaller diameter portion 154 to the larger diameter portion 150 and thus from the gas chamber 106 to at least one of the first outlet 22 or second outlet 26. Gas will continue to flow from the gas chamber 106, to the first outlet 22 and/or the second outlet 26 as long as the middle magnet 126 remains energized by the control panel 142 and at least one of the broil burner magnet 130 and the bake burner magnet 122 remain energized by the thermocouple 220, 228. As a desired temperature is attained, the control panel 142 releases the middle magnet, and the thermocouple 220, 228 cools, decreasing the voltage provided and de-energizing the magnet 122, 130.

Referring to the bake burner schedule 202 and the middle magnet schedule 206 in the timing diagram 186 of FIG. 9, the bake burner magnet 122 and middle magnet 126 may be cycled on and off to maintain the desired temperature. Also referring to the broil burner schedule 210 and the middle magnet schedule 206 in the timing diagram 186 of FIG. 9, the broil burner magnet 130 and middle magnet 126 may be cycled on and off to maintain the desired temperature. Initially, all magnets 122, 126, 130 may be in the first position, preventing gas flow from the gas chamber 106 to the second outlet 26 and from the gas chamber 106 to the first outlet 22.

Figure 10:
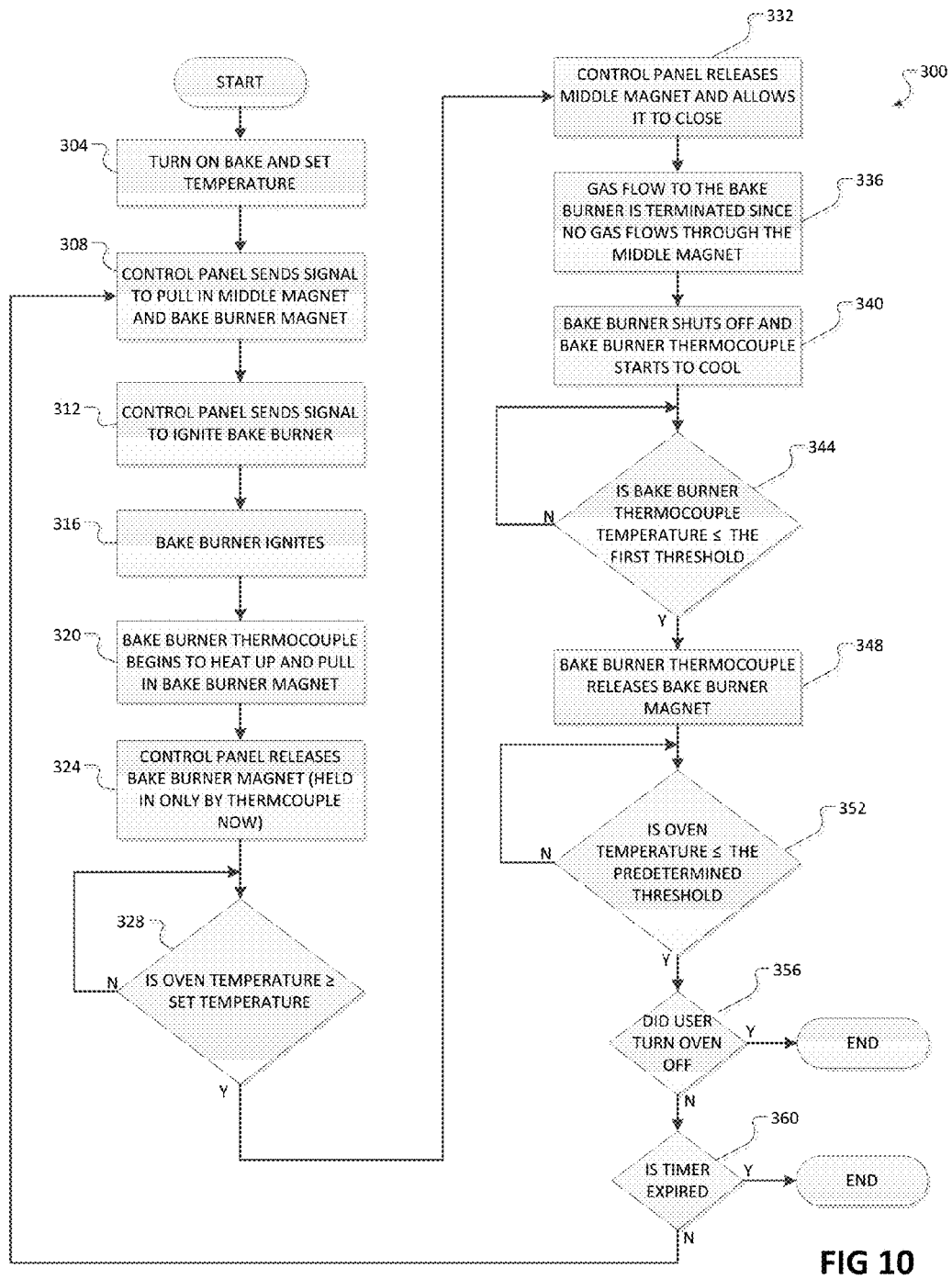
FIG. 10 is a flow chart of a method for controlling the bake burner of the oven.

Additionally referring to FIG. 10, in conjunction with FIGS. 8 and 9, a bake burner control method 300 is illustrated. The user turns on the bake portion of the oven and sets the temperature at step 304. When the bake burner 122 is turned on, the control panel 142 emits an electric signal to first energize the middle magnet 126 and then the bake burner magnet 122 at step 308. The middle magnet 126 and bake burner magnet 122 are energized by the control panel 142 moving each magnet head 166 from the first position to the second, or open, position. The control panel 142 will always perform the initial energization, because the control panel 142 is enabled when the user turns the bake burner on.

At step 312, the control panel 142 sends a signal to ignite the bake burner 216, and at step 316, the bake burner 216 ignites. As the bake burner 216 emits heat, the bake burner thermocouple 220 begins to heat up and create sufficient electrical current to maintain the bake burner magnet 122 in the open position at step 320. At step 324, the control panel 142 ceases sending its electrical current to the bake burner magnet 122, giving full bake burner magnet 122 control to the bake burner thermocouple 220. More particularly, the thermocouple 220 is used to control the bake burner magnet 122 following the initial energization because thermocouple 220 is activated by the bake burner flames to generate the electrical current which maintains the bake burner magnet 122 in the open position. If the thermocouple 220 does not receive sufficient temperature gradient to generate the necessary amount of electrical current, as in the situation where the bake burner flame goes out or otherwise malfunctions, then the bake burner magnet 122 will be released to the closed position whereby the continuous, unnecessary flow of gas to the bake burner will be prevented. As a further example, once the desired temperature of the bake burner 216 is attained, the control panel 142 sends a signal to the middle magnet 126 to close which in turn starves the bake burner 216 of gas. This causes the thermocouple 220 to cool, whereby insufficient electrical current is generated to maintain the bake burner magnet 122 in the open position and it is therefore released and also moves to the closed position.

At step 328, the control panel 142 determines whether the oven temperature is greater than or equal to the set temperature. The control panel 142 communicates with the thermostat 212 to determine the temperature of the oven and compares the temperature to the set temperature provided by the user. If true at step 328, the control panel 142 releases the middle magnet 126 at step 332. When the middle magnet 126 is released, the head 166 of the middle magnet 126 is returned from the second position to the first position, or turned off, by discontinuing energization of the magnet 126. If false at step 328, the control panel 142 continues to determine whether the oven temperature is greater than or equal to the set temperature.

Once the middle magnet 126 is closed, gas flow from the gas chamber 106 to the passage 162 is terminated at step 336. At step 340, the bake burner 216 shuts off from lack of fuel and the temperature of the bake burner thermocouple 220 begins to decrease. The bake burner thermocouple 220 continues to cool until the temperature of the bake burner thermocouple 220 decreases beyond a first threshold temperature at step 344 wherein sufficient electrical current to maintain the bake burner magnet in the open position is no longer generated. The first threshold is the temperature at which the electrical current from the bake burner thermocouple 220 is insufficient to maintain the bake burner magnet 122 in the open position. The first threshold temperature may vary, depending on the particular thermocouple used.

As described, once the temperature of the bake burner thermocouple 220 decreases beyond the first threshold, the bake burner thermocouple 220 no longer provides enough electrical current to energize the bake burner magnet 122 and releases the bake burner magnet 122 at step 348. When the bake burner magnet 122 is released, the head 166 of the bake burner magnet is returned from the second position to the first position, or turned off, by discontinuing energization of the magnet 122. This turns off the gas flow to the bake burner and prevents undesirable gas flow without a bake burner flame.

At step 352, the thermostat 212 communicates with the control panel 142 to determine whether the oven temperature is less than or equal to a predetermined threshold. The predetermined threshold may be a calibratable temperature and may be dependent upon the user set temperature. For example only, the predetermined threshold may be the temperature that is approximately 70% of the set temperature (however, this threshold temperature can be established differently by different control panel manufacturers). If true at step 352, the control panel 142 further determines whether the user shut off the oven at step 356. If false at step 352, the control panel 142 continues to monitor the oven temperature and determine whether the oven temperature is less than or equal to the predetermined threshold.

If the user has turned off the oven at step 356, then the bake burner control method 300 ends. If the user has not turned off the oven at step 356, the control panel 142 determines whether a timer has expired at step 360. When the user turned on the oven and set the bake temperature at step 304, the user had the option to set the timer to automatically shut off the oven after a set duration. If the user chose to set the timer, and the timer has expired at step 360, the bake burner control method 300 ends. If the timer has not expired or the user did not set a timer at step 360, the bake burner control method 300 returns to step 308, and the control panel 142 sends a signal to latch in the middle magnet 126 and the bake burner magnet 122. The bake burner control method 300 continues until the user turns off the oven at step 356 or the timer expires at step 360.

Figure 11:
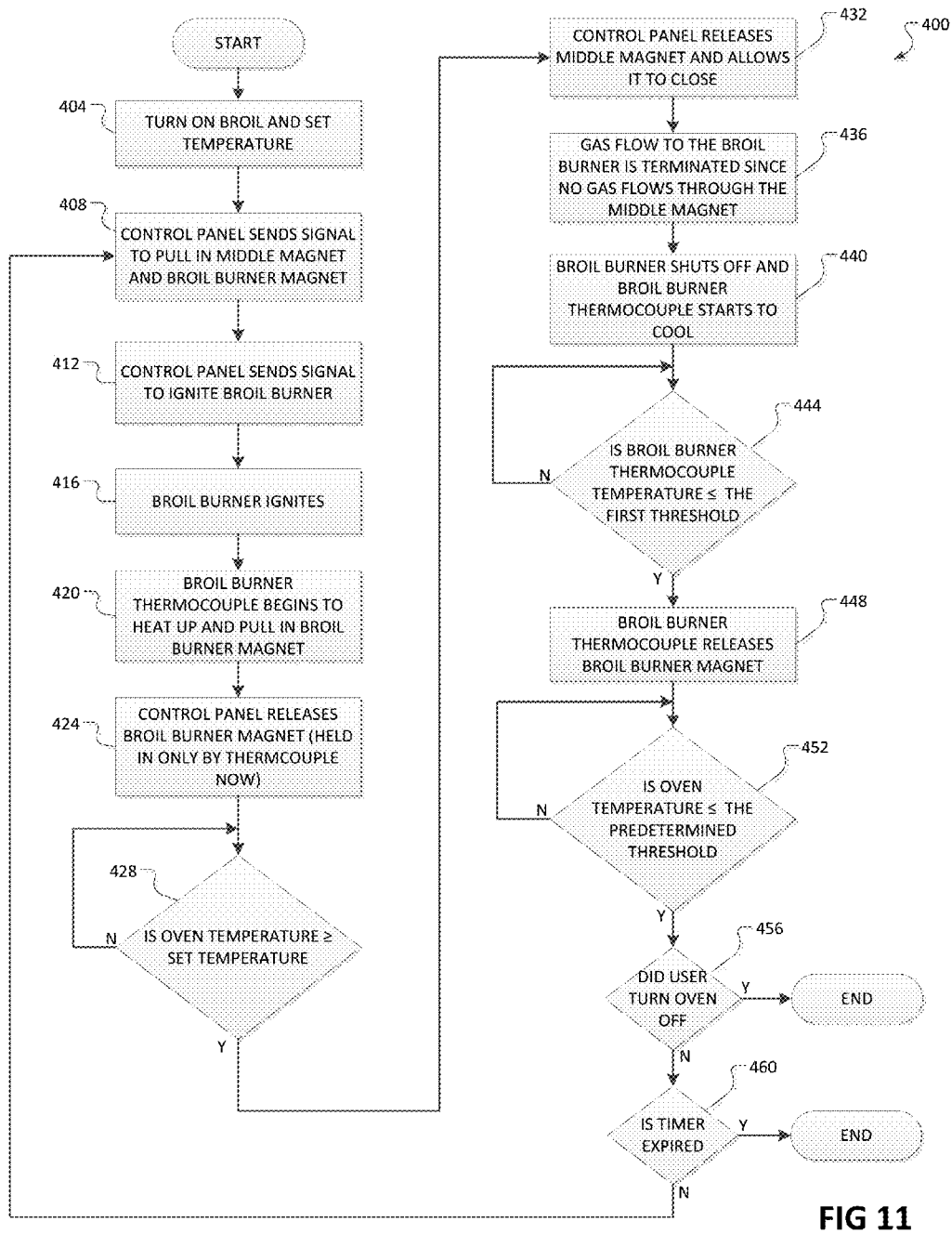
FIG. 11 is a flow chart of a method for controlling the broil burner of the oven.

Now referring to FIG. 11, in conjunction with FIGS. 8 and 9, a broil burner control method 400 is illustrated. The broil burner control method 400 may be similar to the bake burner control method 300. The broil burner control method 400 begins when the user turns on the broil portion of the oven and sets the temperature at step 404. When the broil burner 130 is turned on, the control panel 142 emits an electric signal to first energize the middle magnet 126 and then the broil burner magnet 130 at step 408. The middle magnet 126 and broil burner magnet 130 are energized by the control panel 142 moving each magnet head 166 from the first position to the second, or open, position. The control panel 142 will always perform the initial energization, because the control panel 142 is enabled when the user turns the broil burner on.

At step 412, the control panel 142 sends a signal to ignite the broil burner 224, and at step 416, the broil burner 224 ignites. As the broil burner 224 emits heat, the broil burner thermocouple 228 begins to heat up and generate sufficient electricity to maintain the broil burner magnet 130 in its pulled in or open position at step 420. At step 424, the control panel 142 releases the broil burner magnet 130, giving full broil burner magnet 130 control to the broil burner thermocouple 228. The thermocouple 228 is used to control the broil burner magnet 130 following the initial energization because the amount of electrical current generated by thermocouple 228 is directly affected by actual changes of the temperature of the broil burner that are sensed by the thermocouple 228. For example, once the desired temperature of the broil burner 224 is attained and the middle magnet 126 is released, gas to the broil burner 224 ceases to flow and the burner flame will go out. When the temperature of the burner decreases to a point that the electrical current generated by the thermocouple falls below the amount needed to maintain the broil burner magnet 130 in the open position, the broil burner magnet 130 will be released to the closed position as well. If for some reason, the middle magnet 126 is open but the broil burner does not generate sufficient temperature (due to a malfunction) for the thermocouple 228 to hold the broil burner magnet 130 open, the broil burner magnet 130 will close thus preventing continuous, unnecessary flow of gas into the broil burner 224.

At step 428, the control panel 142 determines whether the oven temperature is greater than or equal to the set temperature. The control panel 142 communicates with the thermostat 212 to determine the temperature of the oven and compares the temperature to the set temperature provided by the user. If true at step 428, the control panel 142 releases the middle magnet 126 at step 432. When the middle magnet 126 is released, the head 166 of the middle magnet 126 is returned from the second position to the first position, or turned off, by discontinuing energization of the magnet 126. If false at step 428, the control panel 142 continues to determine whether the oven temperature is greater than or equal to the set temperature.

Once the middle magnet 126 is closed, gas flow from the gas chamber 106 to the passage 162 is terminated at step 436. At step 440, the broil burner 224 shuts off from lack of fuel and the temperature of the broil burner thermocouple 228 begins to decrease. The broil burner thermocouple 228 continues to cool until the temperature of the broil burner thermocouple 228 decreases beyond a first threshold temperature at step 444. The first threshold is the temperature at which the electrical current generated by the broil burner thermocouple 228 is insufficient to hold or maintain the broil burner magnet 130 in the open position. The first threshold temperature may vary by thermocouple manufacturers.

Once the temperature of the broil burner thermocouple 228 decreases beyond the first threshold, the broil burner thermocouple 228 no longer provides enough electricity to energize the broil burner magnet 130 and therefore releases the broil burner magnet 130 at step 448. When the broil burner magnet 130 is released, the head 166 of the broil burner magnet 130 is returned from the second position to the first position, or turned off, by discontinuing energization of the magnet 130.

At step 452, the thermostat 212 communicates with the control panel 142 to determine whether the oven temperature is less than or equal to a predetermined threshold. The predetermined threshold may be a calibratable temperature and may be dependent upon the set temperature. For example only, the predetermined threshold may be the temperature that is approximately 70% of the set temperature (however, this temperature can be set differently by different manufacturers). If true at step 452, the control panel 142 further determines whether the user shut off the oven at step 456. If false at step 452, the control panel 142 continues to monitor the oven temperature and determine whether the oven temperature is less than or equal to the predetermined threshold.

If the user has turned off the oven at step 456, then the broil burner control method 400 ends. If the user has not turned off the oven at step 456, the control panel 142 determines whether a timer has expired at step 460. When the user turned on the oven and set the broil temperature at step 404, the user had the option to set the timer to automatically shut off the oven after a set duration. If the user chose to set the timer, and the timer has expired at step 460, the broil burner control method 400 ends. If the timer has not expired or the user did not set a timer at step 460, the broil burner control method 400 returns to step 408 and the control panel 142 sends a signal to latch in the middle magnet 126 and the broil burner magnet 130. The broil burner control method 400 continues until the user turns off the oven at step 456 or the timer expires at step 460.

Referring generally to FIGS. 2-11, The American National Standards Institute (ANSI) Range Standard requires that all gas ranges having electric thermostats also include a manual valve with the capability to shut down the gas oven or broiler in case of a "runaway" oven or broiler (the unlikely event that one of the oven or broiler becomes stuck in the open position). The magnet valve described in the present disclosure meets this criterion because the middle magnet 126 serves multiple purposes, one of which is to act as a shut-off valve in cases of runaway ovens or broilers. The middle magnet 126 includes an insulated detachable wiring terminal (not illustrated) that could be readily accessed by a user to shut off the flow of gas to the oven leaving the top burners in an inoperable state. The middle magnet 126 also gives the oven and broil system redundant shut off capability which is very desirable (since historically solenoids have been known to occasionally stick in the "open" position).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A control valve for a burner, comprising:
   a housing having a fluid inlet and a plurality of fluid outlets;
   a plurality of magnets located within the housing, the plurality of magnets including a first magnet, a second magnet, and a third magnet, the first magnet being located between the second magnet and the third magnet;
   a control panel configured to execute an ignition process of the burner and supply current to energize the first, second, and third magnets between a closed position and an open position, and configured to determine whether a temperature is greater than a set temperature; and
   a thermocouple in communication with one of the second and third magnets, the thermocouple being configured to supply current to energize the one of the second and third magnets,
   wherein the second and third magnets control fluid flow to a respective fluid outlet and the first magnet controls fluid flow to the second and third magnets, wherein during the ignition process of the burner, the control panel energizes the first magnet and one of the second and third magnets to permit fluid flow to one of the fluid outlets in communication with the burner, which heats the thermocouple and permits the thermocouple to energize the one of the second and third magnets and maintain the one of the second and third magnets in the open position, and wherein when the control panel determines that the temperature is greater than the set temperature, the control panel de-energizes the first magnet to terminate fluid flow to the second and third magnets.

2. The control valve of claim 1, wherein each of the first, second, and third magnets further includes a head connected to a body with a rod that is slideably attached to the body such that the head and rod move along a longitudinal axis relative to the body.

3. The control valve of claim 2, further comprising a spring located between the head and the body along the rod, wherein the spring biases the head in a first position.

4. The control valve of claim 3, wherein when the head is in the first position, the head of the magnet prevents fluid flow from the fluid inlet to one of the plurality of outlets.

5. The control valve of claim 3, wherein when the magnets are energized, the head of the magnets move from the closed position to the open.

6. The control valve of claim 5, wherein when the head is in the open position, the head of the magnet permits fluid flow from the fluid inlet to one of the plurality of outlets.

7. A control valve for a burner comprising:
a magnet regulator having a housing including a plurality of cylindrical apertures, each cylindrical aperture having a first diameter portion that is larger than a second diameter portion;
a plurality of magnets housed within the plurality of cylindrical apertures, the plurality of magnets including a first magnet, a second magnet, and a third magnet, the first magnet being positioned between the second magnet and the third magnet;
a control panel configured to execute an ignition process of the burner and supply a current source for energizing each of the plurality of magnets and configured to determine whether a temperature is greater than a set temperature; and
a thermocouple in communication with one of the second and third magnets, the thermocouple being configured to supply current to energize the one of the second and third magnets,
wherein when the plurality of magnets are not energized, each of the plurality of magnets is in a closed position with the magnet contacting a ledge separating the first diameter portion and the second diameter portion and preventing fluid flow from the first diameter portion to the second diameter portion, and
wherein when the current source energizes at least the first magnet, the energized first magnet is in an open position with the first magnet being separated from the ledge and permitting fluid flow from the first diameter portion to the second diameter portion, and permitting fluid flow to each of the second and third magnets, and
wherein during the ignition process of the burner, the control panel energizes the first magnet and one of the second and third magnets to permit fluid flow to one of the fluid outlets in communication with the burner, which heats the thermocouple and permits the thermocouple to energize the one of the second and third magnets and maintain the one of the second and third magnets in the open position, and wherein when the control panel determines that the temperature is greater than the set temperature, the control panel de-energizes the first magnet to terminate fluid flow to the second and third magnets.

8. The control valve of claim 7, wherein each of the plurality of magnets includes a spring that biases the magnet in the first position.

9. A method for controlling a burner control valve having a fluid inlet, a plurality of fluid outlets, and a plurality of magnets including a middle magnet and a burner magnet, wherein each of the plurality of magnets includes a head connected to a body with a rod that is slideably attached to the body such that the head and rod move along a longitudinal axis relative to the body from a first position preventing fuel flow from the inlet to one of the plurality of outlets to a second position permitting fuel flow from the inlet to the one of the plurality of outlets, the method comprising:
energizing the middle magnet and the burner magnet to move the middle magnet and the burner magnet from the first position to the second position to permit fuel flow to the one of the plurality of outlets;
igniting a burner and heating a thermocouple;
retaining the burner magnet in the second position when the thermocouple heats, wherein the heated thermocouple energizes the burner magnet;
determining whether an oven temperature is greater than a set temperature; and
de-energizing the middle magnet to move the middle magnet from the second position to the first position and terminate fuel flow to the one of the plurality of outlets and the burner when the oven temperature is greater than the set temperature.

10. The method of claim 9, further comprising de-energizing the burner magnet to move the burner magnet from the second position to the first position if a thermocouple temperature is less than or equal to a first threshold.

11. The method of claim 9, further comprising energizing the middle magnet and the burner magnet to move the middle magnet and the burner magnet from the first position to the second position if the oven temperature is less than or equal to an oven temperature threshold.

12. The method of claim 9, wherein energizing the middle magnet permits fuel flow to the burner magnet, and wherein energizing the burner magnet permits fuel flow to the one of the plurality of outlets.

13. The method of claim 9, biasing the middle magnet and the burner magnet in a first position when the middle magnet and the burner magnet are de-energized, wherein the middle magnet and burner magnet are biased in the first position by a spring.

14. The method of claim 9, wherein the burner magnet is a bake burner magnet.

15. The method of claim 9, wherein the burner magnet is a broil burner magnet.

16. The method of claim 9, wherein a control panel initially energizes the middle magnet and the burner magnet and when the thermocouple heats up and energizes the burner magnet, the control panel releases the burner magnet such that the burner magnet is held in the second position only by the thermocouple.

17. The method of claim 9, wherein the thermocouple is one of a bake burner thermocouple and a broil burner thermocouple.

* * * * *